July 8, 1930.  C. L. MARTINO  1,770,351
APPARATUS AND METHOD FOR USE IN THE TAKING OF MOTION PICTURES
Filed April 18, 1927  3 Sheets-Sheet 1
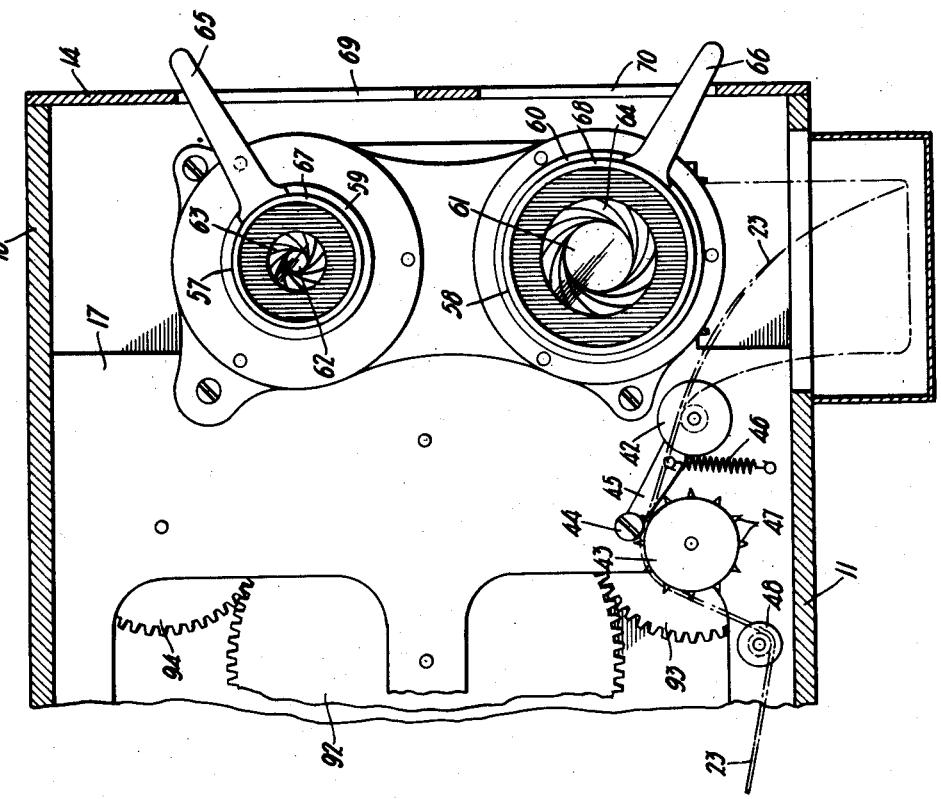
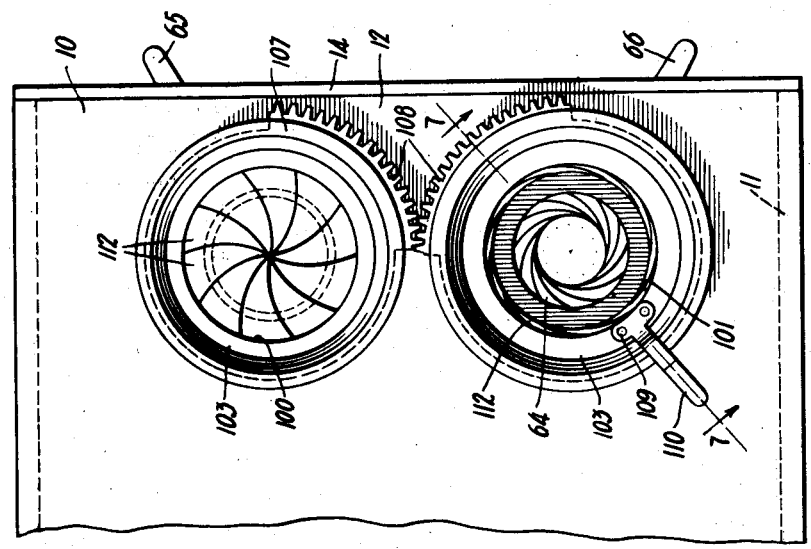
Ciro Luigi Martino Inventor
by
William L. Morris Attorney July 8, 1930.   C. L. MARTINO   1,770,351
APPARATUS AND METHOD FOR USE IN THE TAKING OF MOTION PICTURES
Filed April 18, 1927   3 Sheets-Sheet 2
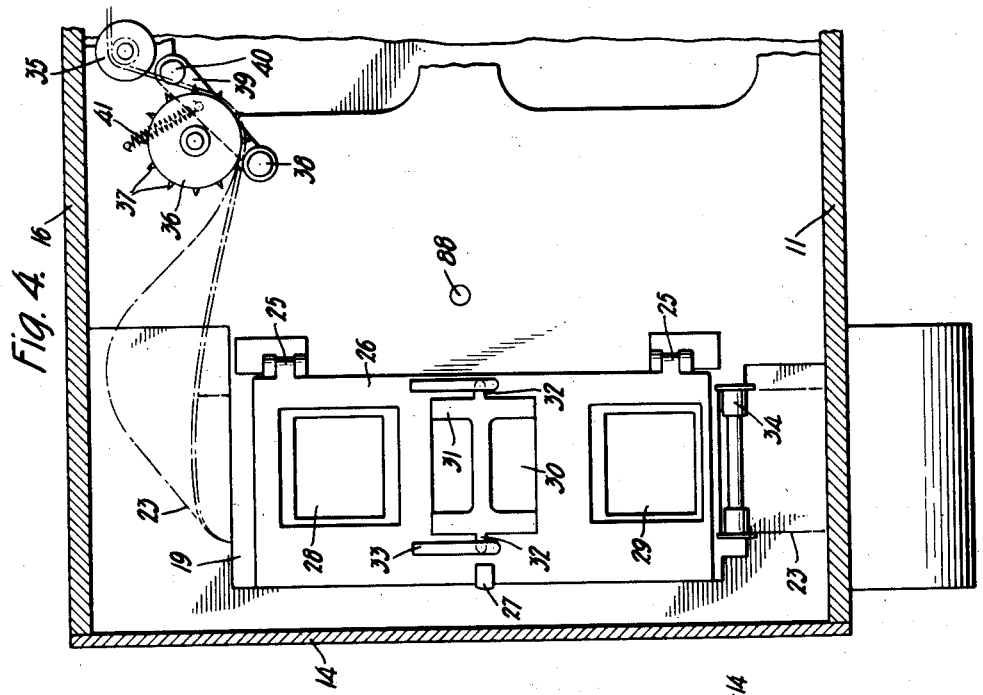
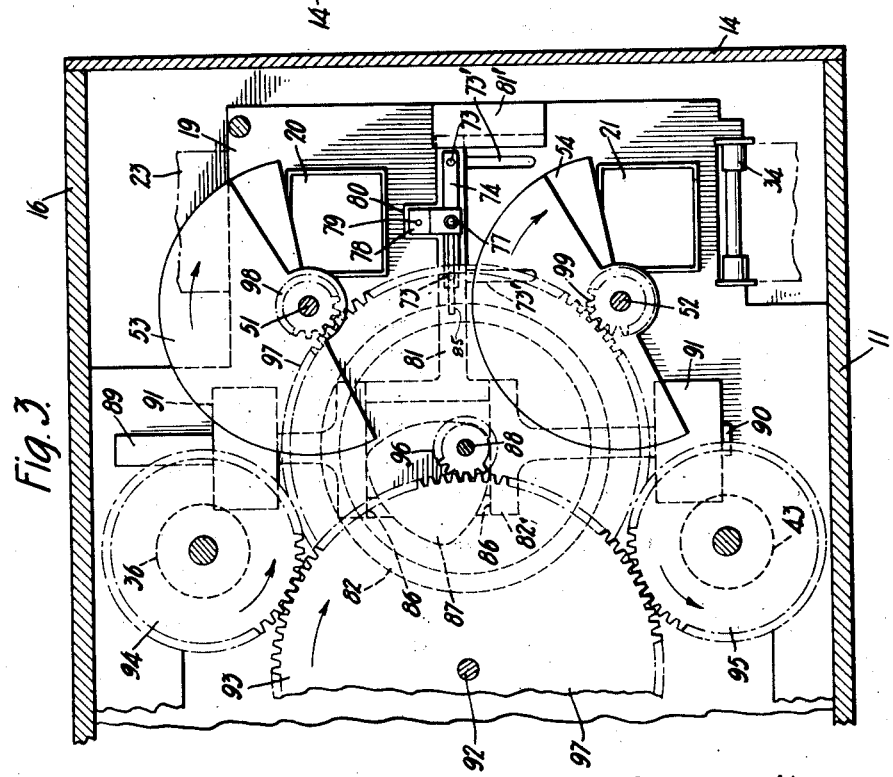
CiroLuigi Martino  Inventor
by
William L. Morris  Attorney July 8, 1930.  C. L. MARTINO  1,770,351
APPARATUS AND METHOD FOR USE IN THE TAKING OF MOTION PICTURES
Filed April 18, 1927   3 Sheets-Sheet 3
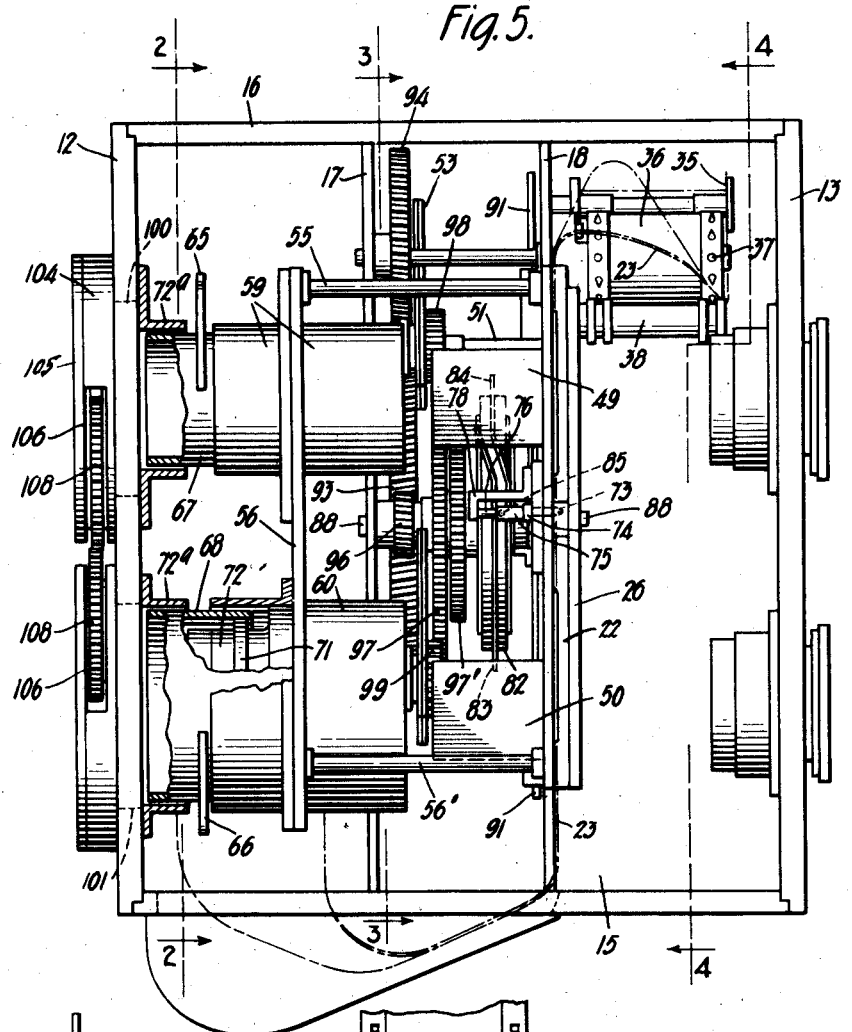
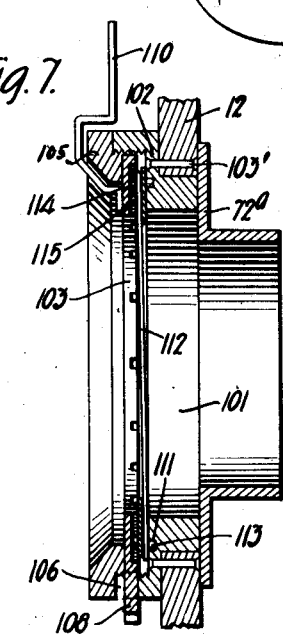
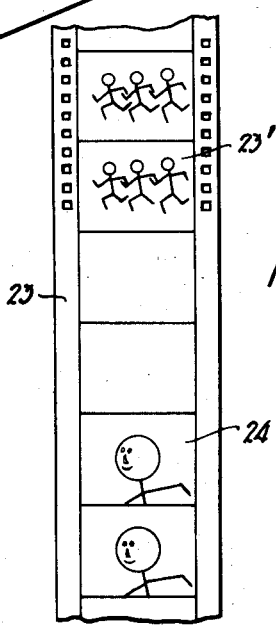
Ciro Luigi Martino
Inventor
by William L. Morris
Attorney Patented July 8, 1930

1,770,351

UNITED STATES PATENT OFFICE

CIRO LUIGI MARTINO, OF NEW YORK. N. Y., ASSIGNOR TO HIMSELF, JOSEPH A. WALSH, PATRICK NARDELL, AND WILLIAM L. MORRIS, ALL OF NEW YORK, N. Y.

APPARATUS AND METHOD FOR USE IN THE TAKING OF MOTION PICTURES

Application filed April 18, 1927. Serial No. 184,565.

The present invention relates to apparatus and methods for use in the taking of motion pictures. More particularly, the invention relates to apparatus and methods for use in the taking of pictures where in both long-shots and close-ups, so-called, of the object or action, are to be presented with apparent continuity of scene or action.

For sometime it has been customary to suspend the action for change of lenses in the camera, or successively to employ two cameras set at different distances from the scene of action. In the one instance, the action is not picked-up again exactly where it was interrupted and is then often picked up only after repeated trials by the actors, usually with considerable waste of film and loss of time. In the other instance duplication of equipment is involved and the perspectives of the long-shot and close-up are different, since two machines cannot be set at the same time in one line of vision. Furthermore the lighting arrangements must usually be changed with change from long-shot to close-up, or vice versa; and since the close-up camera is at one or the other side of the centre, its field is accordingly limited. Latterly two cameras with lenses of different magnitudes or foci have been set together, and even superposed, so that one operator may operate both; and, expeditiously and while the act progressives, change from long-shot to close-up, or vice versa. Here again, however, there is expensive duplication of apparatus, and there is ultimately involved the work, expense and loss of time of cutting and patching together the films from the two cameras to prepare a single film representing the complete action.

An object of the present invention is the introduction of an apparatus and method wherein the above-noted undesirable features are absent, and whereby an uninterrupted action may be photographed, both at long-shot and in close-up, in one camera, without movement of the camera, and on a single film.

In effecting this object of the invention I employ two lenses of different magnitudes, or foci, through either of which one at a time a single film, during the usual intermittent feed of the same, may be exposed to light from the objects being photographed; and I provide for selectively, and at will, at any stage of the action disabling or cutting off the light from the lens therefore in action, and exposing the film to light through the other lens. In this aspect of the invention there is at a given time, but a single effective aperture through which to expose the film to the light from the field of action; and the change from long-shot to close-up, and vice versa, is effected by relative movement of the two lenses and the aperture. The lenses may be fixed one above the other in the camera and a plate having a single aperture therein, interposed between the lenses and the film, be snapped up or down to register the aperture with the desired lens; or other means may be provided for effecting the aforesaid relative movement. In the preferred form of the invention the lenses are fixed as to position; and so is the aperture plate which is between the lenses and the film. The aperture plate has two apertures, however, one in register with each lens, and therefore the relative movement of effective aperture and lenses must here be accomplished by means for cutting off the light from one or the other aperture, as the case may be.

In the preferred form of the apparatus, I provide two irises, one in front of each lens, on the face of the camera box. These will be distinguished in function from the iris commonly associated with a lens to determine the size of aperture or light to be used in taking a picture. The usual iris I also preferably employ in connection with each lens; and for its old and well known purpose. The irises first above mentioned are not, however, for the purpose of determining the size of aperture or light, but for the purpose of completely cutting out the light or disabling one or the other lens. By closing one of these new irises and opening the other the position of effective aperture is shifted with respect to the lenses. Any suitable means may be provided for the operation of the new irises. In this connection, however, a feature of the invention is a gearing of one iris to the other, so that, by one and the same finger-piece and movement, one iris closes when the other opens.

A further object of the invention has to do with so-called dissolvency. It is well known practice in the motion picture art to cause a close-up view to gradually fade away while a long-shot view, gradually intensified, is superposed thereon; so that, finally, the close-up has entirely disappeared and the long-shot substituted therefor, or vice versa. In such practice, the film continues its advance feed until the fade-out is completed. It has then either been set back to the point of commencement thereon of the fade-out, and again fed forward while the new view is brought in; or, the new view is brought in gradually, after the fade-out is complete, and without set-back of the film. In the one instance, there is involved the almost unsuperable difficulty of correctly re-producing on a given set-back length of the film, the same action, in the one allowable readvance of such given length of set-back portion, as was produced thereon in the fade-away. In the other instance the attempt at correct reproduction of action is not limited to a given set-back length of film; but on the other hand vast quantities of film, and time and effort of the actors and all concerned, may be wasted in successive re-takes in the effort to re-produce, in bringing-in the close-up, the same expressions and positions of actors as were registered in the fade-out; and then further loss and work is involved in selecting and cutting the film for overlap of the fade-out of the long-shot with a selected piece of the same length bringing in the close-up, or vice versa; and there are certain difficulties involved in printing through overlapped film. These troubles have generally had added thereto the troubles hereinabove mentioned as having heretofore been more or less inherent to change from long-shot to close-up, or vice versa, where no dissolvency was involved.

An object of the present invention is a method and a construction of my apparatus such as to eliminate the above mentioned troubles heretofore associated with dissolvency, and to provide means whereby the gearing connecting the irises in front of the lenses may cause one iris to be gradually closed, at any desired rate of speed and at the same rate that the other is opened, until one is finally closed just as the other is completely opened. The fade-away of the long-shot and the bringing-in of the close-up are therefore taken, one superposed on the other, at the same exposure; and both must therefore exactly agree as to expressions and positions of actors, on one taking of the picture and on one and the same uninterrupted feed of the film, without involving any change of cameras or camera positions; back-setting, re-setting, cutting or patching of film; or printing through overlapped films.

It will be understood that the gearing connecting the irises may be abruptly actuated to change from long-shot to close-up or vice versa, without dissolvency; or slowly actuated where dissolvency is desired. It will also be understood that the terms long-shot and close-up are relative terms here indicating the use of a plurality of lenses of different magnitudes or foci.

The above and other features of the invention will more fully appear upon reference to the accompanying drawings, in which:

Fig. 1, is a front view of the right hand end of the camera box.

Fig. 2, is a view in cross section taken on the line 2—2 of Figure 5, looking in the direction of the arrow.

Fig. 3, is a view in cross section taken on the line 3—3 of Figure 5, looking in the direction of the arrow.

Fig. 4, is a view in cross section on the line 4—4 of Figure 5, looking in the direction of the arrow.

Fig. 5, is a view of the camera in right hand side elevation, parts being broken away for a clearer illustration, and the right hand cover of the camera box being removed.

Fig. 6, is a section of film illustrating on one part thereof, a distant view, and on another part thereof a close-up view of the object.

Fig. 7, is a view in cross section on the line 7—7 of Fig. 1, showing the iris mounting at the front of the camera.

Referring to the drawing, the camera box 10 is shown as comprising a base 11, and removable front and rear walls 12 and 13, removable right end wall 14, and fixed left end wall 15, and a top 16. Secured to and connecting the top and bottom of the box and left end wall are frame pieces 17 and 18 for supporting the camera mechanism. These frame pieces extend longitudinally of the box from the left hand end thereof, and are spaced apart to serve as bearings and housing for certain of the mechanism.

The rear frame piece or standard 18, at its right hand end is provided with a wing 19 having two apertures 20 and 21 therethrough in vertical alignment. On the rear face of this wing 19, vertically disposed guide pieces 22 form a raceway for the film 23. Upon reference to Figure 6 it will be seen that the last distant view 23′ of the object is three panels above and removed from the first close-up view 24 of the object. This three panel spacing represents the spacing of the aperture 21 below the aperture 20 in the wing piece 19. Hinged at 25, see Figure 4, to the rear of the wing piece 19 is a gate 26, adapted to be opened for placement of the film in its raceway, and to be thereupon closed to hold the film in position. A latch 27 holds the gate in closed position. The gate is provided with two windows 28 and 29 in alignment respectively with the apertures 20 and 21 in the wing piece 19. The gate 26 is also provided with an intermediate aperture 30, in which is seated an H shaped block 31, having laterally projecting fingers 32 upon which bear leaf springs 33 secured to the rear face of the gate. The springs 33, cause the block 31 to hold the film snugly to its seat in the raceway while providing yield to permit of proper feed of the film. Pivotally mounted in ears on the wing piece 19 below the gate 26 is a flanged roller 34, for turning and guiding the film forward as the same passes off the raceway.

The film is wound upon a rotary delivery roll or drum (not shown) pivoted to the rear frame piece 18 toward the left hand side of the box. As indicated in Figure 4, the film 23, is fed from its delivery roll, through the guide roll 35, thence downward, under and around a feed sprocket 36, the teeth 37 of which engage with the usual aligned feed holes in the film. A roll 38 on an arm 39 pivoted at 40 to the frame piece 18 is held by a spring 41 against the film to maintain proper contact of the latter with the feed sprocket 36. From the feed sprocket 36 the film is fed toward the right to a point over the raceway and gate where it is turned 90° and fed into the raceway. From the roll 34 at the foot of the raceway the film as shown in Figures 2 and 5 is fed forward, again turned 90°, and is then fed leftward from the guide roll 42, and thence over and around a pick-up feed sprocket 43. A roll 44 on an arm 45 pivoted to the front frame piece member 17 is caused by a spring 46 yieldingly to bear upon and hold the film to the pick-up sprocket 43, so that the teeth 47 of the latter may properly engage in the film. From the pick-up sprocket 43 the film passes under and around a guide roll 48 and thence to a take-up drum, pivoted to the front frame member 17 toward the left of the box. It will be understood that the delivery or supply and the pick-up drums are suitably driven from the usual crank or other motor mechanism.

Secured to and projecting forward from the rear frame plate 18, and concentric with the axes of the apertures 20 and 21 in such frame piece are hoods 49 and 50 respectively. Rotatably mounted on shafts 51 and 52 which are supported at their ends in the frame pieces 17 and 18 are shutters 53 and 54 of the usual segmental type. These are rotated by means hereinafter to be described. Extending forward from the wing piece 19 of the rear frame plate 18 are studs 55 and 56' which support a third frame plate 56 somewhat in front of the frame plate 17. This frame plate 56 has circular apertures 57 and 58 therein in axial alignment with the apertures 20 and 21 in the wing piece 19.

Fixedly supported on the plate 56 and concentric with the apertures 57 and 58 are cylindrical housings 59 and 60, each having two lenses and an iris between the lenses. The lenses are adjustable to vary the focus for different positions of the object. It will be noted upon reference to Figures 2 and 5 that the lower housing 60 is larger than the upper housing 59. This is because the lenses 61 of the lower housing are larger than the lenses 62 of the upper housing: and the reason for the use of two housings and two lenses, one larger than the other, is, as hereinbefore stated, that the camera of the present invention is adapted for both distant and close-up views, and accordingly requires two lenses of different size and foci. The irises 63 and 64, to which we have just been referring, are for the purpose of regulating the effective apertures or light in a manner well known in the ordinary camera, and may be of any well known type. They are shown as of a well known type, adapted to be expanded and contracted by rotary movement of a sleeve element in which they are seated. For separate rotary adjustment of the two irises there are provided two finger pieces 65 and 66 which are fixed at their inner ends to sleeves 67 and 68 respectively, and which project outward through slots in the housings 59 and 60, and through slots 69 and 70 in the right hand wall 14 of the casing. Each sleeve 67 and 68 (see Figure 5) is in frictional engagement with a collar 71 on a cylindrical member 72, in which the iris is seated, and by the rotary movement of which the iris is operated. Referring again to Figure 5, it will be noted that the two housings 59 and 60, or rather the hood and sleeve extensions 67 and 68 thereof, protrude within light-excluding cups 72ª, secured to the inner face of the front wall 12 of the casing.

It will be understood that the film has the usual intermittent feed. This intermittent motion may be effected in any well known manner. Ordinarily pins are provided which are caused to move toward the tape, to enter the feed holes in the edges thereof; then to advance with the tape along the path of movement of the latter; then to withdraw from the tape and return backward along the path of the tape to their original station preparatory to the next feed. The movement of the pins in and out of the tape is commonly effected by one cam, and the movement of the pins forward and backward along the path of the tape by another cam. No claim for any novelty as to this feature of the structure is here made. The mechanism shown in the drawings for effecting such intermittent film movement is as follows:—

Referring to Figures 3 and 5, the tape feed pins 73 are shown as carried, one on either end of the cross-bar 74, in front of the wing piece 19 of the frame plate 18. The cross-bar 74 to which the pins 73 are fixed is free to move forward and backward with respect to the plate 19. On the cross-bar 74 is a boss 75 and projecting rearward from the boss 75 is a pin 76 adapted to slide backward and forward in a hole 77, in a bracket 78 which serves as a support at one end, and carrier, for the pin 76 and cross-bar 74. The bracket 78 is pinned at 79 to a lug 80 on an arm 81 of a cross-head 82'. The pins 73 project from the cross-bar 74 rearward through the arm 81 of the cross-head and into slots 73' which extend through the wing piece 19 of the plate 18. The pins 73 therefore have the additional function of cooperating with the bracket 78 in supporting the cross-bar 74 on the arm 81. When as shown in Figure 5 the cross-bar 74 abuts the carrying arm 81, the pins 73 have been passed through the plate 19, and the film 23, so as to engage the latter for downward advance thereof. When, on the other hand, the cross-bar has been withdrawn from the face of the carrying arm 81, until the lug 75 of the cross-bar 74 abuts the depending portion of the bracket 78, the pins 73 are withdrawn not only from the film but from the plate 19, so that the cross-bar 74 may be moved upward with the pins. The slots 73' permit the downward movement of the pins 73 with the film, and a plate 81' on the wing piece 19 overlaps the carrying arm 81 to guide and hold the same during the upper and downward movement of the latter.

For effecting this in and out movement of the bar and pins with respect to the film and plate 19, there is provided a cam wheel 82, having on the periphery thereof two cam plates 83 and 84, which extend around the cam wheel in opposite directions and which have suitable parallel off-sets so spaced apart as to receive therebetween a pin 85 which projects laterally lengthwise of the carrying arm 81 from the boss 75 of the cross-bar 74. The off-set portions of the cam plates 83 and 84 effect and control the in and out movement of the cross-bar 74, and other portions of the cam plates 83 and 84 permit of free up and down movement of the cam pin 85 with the cross-bar 74. The position of the cam pin 85 with respect to the straight portions of the plates 83 and 84 is determined on the one hand by the abutment of the cross-bar 74 with the carrying arm 81 and on the other hand with the abutment of the boss 75 of the bar with the bracket 78. It follows, therefore, that as the cam wheel 82 rotates the cross-bar and film feed pins 73 move in and out. A means for rotating the cam wheel 82 will presently be described.

For effecting the up and downward movement of the cross-bar 74 with the pins 73 in advancing the film and in returning the same to their original station preparatory to the next feed, the cross-head 82' of which the carrying arm 81 is a part, is slotted or otherwise shaped to have two shoulders 86 to embrace and be engaged by a cam 87. The cam 87 is eccentrically and fixedly secured to a rotary shaft 88, so that as the shaft 88 rotates the cross-head 82' has a moment of rest, while the pins 73 move in to the film, and then a downward movement to cause the pins 73 to advance the tape, then a moment of rest as the pins are withdrawn from the tape and from the plate 19, and then an upward movement to carry the cross-bar 74 to its original station. The cross-head is provided with vertically extending upper and lower arms 89 and 90 which are adapted to slide in straps or brackets 91 secured to the front face of the frame plate 18. The cam wheel 82 by which the in and out movement of the pins is effected is also fastened to the shaft 88 to which the cam 87 is fixed, so that these two cams once given a fixed relation one to the other, rotate together in such fixed relation.

The rotary parts hereinbefore mentioned are the sprocket feed wheels 36 and 43, the delivery and pick-up drums not shown, the shutters 53 and 54, and the cams 82 and 87. All these parts may be driven by a crank handle or other source of motor power, by any suitable gearing.

The crank is not shown but the shaft thereof may have the delivery and pick-up drums mounted thereon. Intermittent feed of the tape with constant rotation of the crank may be taken care of by slack in the tape. This crank shaft is connected by gears, not shown, to a shaft 92. Fastened to the shaft 92 is a gear 93 which meshes with a gear 94 fastened to the upper feed sprocket 36 and a gear 95 fastened to the lower feed sprocket 43. The gear 93 also meshes with a small pinion 96 fastened to the shaft 88 to which the cams 82 and 87 are keyed. The crank handle, not shown, is also independently geared to a gear 97', fastened to a large gear 97 which is loose on the cam shaft 88. The gear 97 meshes with two pinions 98 and 99, to the hubs of which the upper and lower shutters 53 and 54 are respectively fixed.

In the front plate 12, of the camera box are two openings, 100 and 101 concentric respectively with the lens housings 59 and 60. On the outside face of the front plate 12, concentric with the openings 100 and 101 are rings 102, and screws 103' extending through the flanges of the cups 72ª, and through the plate 12, serve to hold both the cups 72ª and the rings 102 in place upon the plate 12. Spaced apart and arranged in a circle on the outer face of each ring 102 are pin holes 111 to serve as pivot points for the individual leaves 112 of an iris. This iris like the irises 63 and 64 may be of any well known construction. Certain general features of one form of iris are shown in the U. S. Letters Patent to Leonard, 1,392,876, dated October 4, 1921.

As shown in the Leonard patent referred to each iris leaf has a pin 113 projecting from one face thereof, and near one end thereof. It is these pins 113 which extend into the spaced pin holes 111, in the rings 102, above referred to. Set over each ring 102, and over the iris leaves pivoted thereto, is a second ring 103 which is free to be revolved. The inner face of this second ring has a series of radial slots 114 therein. Also as indicated in the Leonard patent above referred to, each of these radial slots is adapted to receive another pin 115 projecting from the front face of an iris leaf. It follows, that when the ring 103 is rotated, the iris leaves maintain their pivots on the ring 102, but by reason of their being in pin-and-slot engagement 115—114 with the ring 103 they are caused to swing on their aforesaid pivots 113 one way or the other, according to the direction in which the ring 103 is rotated. If the ring 103 is turned in one direction the movement of the iris leaves is such as to effect a closing of the iris aperture, as indicated in the upper iris of Figure 1, whereas if the ring 103 is rotated in the opposite direction the pivotal movement of the iris leaves is such as to cause an opening of the aperture as indicated in the lower iris of Figure 1. The ring 102 has an outwardly projecting peripheral flange 104, which embraces the ring 103, and not only serves to center the same upon its seat but provides a bearing for the ring 103 in its various rotary movements. The outer edge of the flange 104 is threaded to receive a cap 105 which may be screwed into the flange 104 to hold the ring 103 and the iris leaves against outward displacement.

Referring to Figures 1 and 5 it will be noted that the flange 104 of the ring 102 is slotted peripherally at 106 to permit the projection therethrough of a segment of the ring 103. This segment of each ring 103 carries a segmental gear 108, and, as indicated in Figures 1 and 5, the two segmental gears 108 mesh one with the other. Secured as by pins 109 on the front face of one of the rotary rings 103, and bent around the flange 104 of the ring 102, and thence projecting radially outward is a finger piece 110 by means of which the connected ring 103, and with it, and through the gears 108 the other ring 103, may be rotated in either direction. It will be noted that the gearing 108 is such that the rotary movement of the rings 103 must always be in the opposite direction. The result of such gearing is that as one iris is opened the other iris is closed, and vice versa.

What I claim is:—

1. In a motion-picture camera, a lens for long-shot work, another lens for close-up work, both lenses being directed to the same scene, means for feeding a film in a path crossing the apertures of both lenses, means for taking pictures at a motion-picture rate through each of said lenses onto said film, and means whereby the film may be exposed to light through either lens, and cut off from light through the other lens.

2. In a motion-picture camera, a lens for long-shot work, another lens for close-up work, both lenses being directed to the same scene, means for feeding a film in a path crossing the apertures of both lenses, means for taking pictures at a motion-picture rate through each of said lenses onto said film, and means for selectively and at will during the operation of the camera closing one lens aperture and opening the other.

3. In a motion-picture camera, a lens for long-shot work, another lens for close-up work, both lenses being directed to the same scene, means for feeding a film in a path crossing the apertures of both lenses, means for taking pictures at a motion-picture rate through each of said lenses onto said film, and means for selectively and at will during the operation of the camera abruptly closing one lens aperture and opening the other.

4. In a motion-picture camera, a lens for long-shot work, another lens for close-up work, both lenses being directed to the same scene, means for feeding a film in a path crossing the apertures of both lenses, means for taking pictures at a motion-picture rate through each of said lenses onto said film, and means for selectively and at will during the operation of the camera gradually closing one lens aperture and opening the other.

5. In a motion-picture camera, a lens for long-shot work, another lens for close-up work, both lenses being directed to the same scene, means for feeding a film in a path crossing the apertures of both lenses, an iris or shutter for each lens, and gearing connecting the iris or shutter of one lens with that of the other; such that as one iris or shutter is opened the other is closed.

6. In a motion-picture camera, a lens for long-shot work, another lens for close-up work, both lenses being directed to the same scene, means for feeding a film in a path crossing the apertures of both lenses, an iris or shutter for each lens, a rack or pinion on each iris or shutter, said racks or pinions intermeshing, so that as one iris or shutter is opened the other is closed.

7. In a motion-picture camera, a lens for long-shot work, another lens for close-up work, both lenses being directed to the same scene, means for feeding a film in a path crossing the apertures of both lenses, an iris or shutter for each lens, a gearing connecting the iris or shutter of one lens with that of the other; such that as one iris or shutter is opened, the other is closed, and means for operating said gearing, such that either abrupt or gradual opening and closing of the irises or shutters may be effected.

8. In a motion-picture camera, a lens for long-shot work, another lens for close-up work, both lenses being directed to the same scene, means for feeding a film in a path crossing the apertures of both lenses, the apertures of such lenses being spaced apart on said path a distance which is a multiple of the film feed, or panel steps of the film, so that the film panels will successively and truly register with the apertures of the two lenses, and means whereby the film may be exposed to light through either of the lenses, and cut off from light through the other lens.

9. In a motion-picture camera, a lens for long-shot work, another lens for close-up work, both lenses being directed to the same scene, means for feeding a film in a path crossing the apertures of both lenses, the apertures of such lenses being spaced apart on said path a distance which is a multiple of the film feed or panel steps of the film, so that the film panels are successively and truly registered with the apertures of the two lenses, and means whereby the film at different panels thereof may be simultaneously exposed through both lenses, and a dissolvency effected by a fade-away at one lens, and an intensification at the other lens.

10. In a motion-picture camera, a lens for long-shot work, another lens for close-up work, both lenses being directed to the same scene, an aperture plate behind the lenses having an aperture for each lens therein, means for feeding a film in a path crossing both of said apertures, independently adjustable irises for regulating the light through said apertures, a second iris or shutter for each of the said lenses, and means for operating said last named irises or shutters, so that the film may be exposed to light through either lens, and cut off from light through the other lens.

11. In a motion-picture camera, a lens for long-shot work, another lens for close-up work, both lenses being directed to the same scene, an aperture plate behind the lenses having an aperture for each lens therein, means for feeding a film in a path crossing both of said apertures, independently adjustable irises for regulating the light through said apertures, a second iris or shutter for each of said lenses, and gearing connecting said last named irises or shutters such that as one of said last named irises or shutters is opened the other is closed.

12. In a motion-picture camera, a lens for long-shot work, a lens for close-up work, both lenses being directed to the same scene, means for intermittently exposing one and the same film at a motion-picture rate, through either of said lenses to the object to be photographed, and means or selectively and at will during the taking of a picture, disabling one of said lenses and rendering the other effective for photographing.

13. In a motion-picture camera, a lens for long-shot work, a lens for close-up work, both lenses being directed to the same scene, means for taking pictures onto a film at a motion-picture rate, including an aperture plate for exposure there-through of the film to light through either one of said lenses, and means involving a movement of the position of the light transmitting aperture in the plate relative to the lenses for selectively and at will, during the taking of a picture disabling one of said lenses and rendering the other effective for photographing.

14. In a motion picture camera, a lens for long-shot work, another lens for close-up work, both lenses being directed toward the same scene, means for taking motion pictures by exposing a film to light through each of said lenses, said means including independently operable mechanism for selectively and at will during the operation of the camera exposing the film to light through either of said lenses and cutting off the light through the other lens.

15. In a motion picture camera, a lens for long-shot work having a given effective axial position or station in the camera, another lens for close-up work having a different effective axial position or station in the camera, both lenses being directed toward the same scene, means for taking motion pictures by exposing a film to light through either of said lenses, said means including independently operable mechanism for selectively and at will during the operation of the camera exposing the film to light through either of said lenses and cutting off the light through the other lens.

16. In a motion picture camera, a lens for long-shot work, another lens for close-up work, both lenses being directed toward the same scene, means for taking motion pictures by exposing a film to light through either of said lenses, said means including independently operable mechanism for selectively and at will during the operation of the camera exposing the film to light through either of said lenses and cutting off the light through the other lens, while maintaining the position of said lenses.

Signed at New York, in the county of New York and State of New York, this 13th day of April, 1927.

CIRO LUIGI MARTINO.